US011980206B2

United States Patent
Klucik et al.

(10) Patent No.: US 11,980,206 B2
(45) Date of Patent: May 14, 2024

(54) METHOD FOR REDUCING LOW MOLECULAR WEIGHT SPECIES IN CARAMEL

(71) Applicant: The Coca-Cola Company, Atlanta, GA (US)

(72) Inventors: Josef Klucik, Marietta, GA (US); You Chen, Marietta, GA (US); Patricio Gutierrez, Atlanta, GA (US)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 16/749,438

(22) Filed: Jan. 22, 2020

(65) Prior Publication Data
US 2020/0154729 A1    May 21, 2020

Related U.S. Application Data

(62) Division of application No. 15/320,095, filed as application No. PCT/US2015/036512 on Jun. 18, 2015, now Pat. No. 10,575,535.

(60) Provisional application No. 62/013,896, filed on Jun. 18, 2014, provisional application No. 62/019,648, filed on Jul. 1, 2014.

(51) Int. Cl.
*A23G 3/32* (2006.01)
*A23L 5/48* (2016.01)
*A23L 27/21* (2016.01)

(52) U.S. Cl.
CPC .................. *A23G 3/32* (2013.01); *A23L 5/48* (2016.08); *A23L 27/215* (2016.08)

(58) Field of Classification Search
CPC ............ A23G 3/32; A23L 5/48; A23L 27/215
See application file for complete search history.

(56) References Cited

U.S. PATENT DOCUMENTS

| 2,582,261 | A |   | 1/1952  | Longnecker |                      |
|-----------|---|---|---------|------------|----------------------|
| 3,214,294 | A |   | 10/1965 | Meisel     |                      |
| 4,416,700 | A | * | 11/1983 | Clark      | ........ A23G 3/32   |
|           |   |   |         |            | 127/34               |
| 4,614,662 | A |   | 9/1986  | Ramaswamy  |                      |
| 4,784,696 | A |   | 11/1988 | Ramaswamy  |                      |
| 5,114,492 | A | * | 5/1992  | Wolf       | ........ A23G 3/32   |
|           |   |   |         |            | 127/42               |
| 2,767,108 | A1|   | 10/2011 | Fetzer     |                      |
| 2002/0106437 | A1| * | 8/2002 | Karleskind | ........ A23L 33/185 |
|           |   |   |         |            | 426/590              |
| 2010/0003383 | A1|   | 1/2010 | Parker et al. |                   |
| 2011/0244102 | A1| * | 10/2011 | Ramaswamy | ........ A23L 2/58 |
|           |   |   |         |            | 426/540              |
| 2012/0090602 | A1|   | 4/2012 | Zhang et al. |                    |

FOREIGN PATENT DOCUMENTS

| CN | 102020870      | 4/2011  |
|----|----------------|---------|
| CN | 102634228      | 6/2013  |
| CN | 103740129      | 4/2014  |
| CN | 102642862      | 5/2014  |
| JP | S52-148665     | 12/1977 |
| JP | S63-291687     | 11/1988 |
| JP | 2012-017325    | 1/2012  |
| JP | 2013523127     | 6/2013  |
| WO | WO 2008/047347 | 4/2008  |
| WO | WO 2014-065364 | 5/2014  |

OTHER PUBLICATIONS

Supplemental European Search Report for EP 15809458, mailed May 4, 2018.

Sethness; Caramel Color "Frequently Asked Questions about Caramel Color" 2012 [retrieved on Aug. 20, 2015]. Retrieved from the internet; URL:<http://www.sethness.com/caramel_color_facts/faqs.php>; p. 4.

International Search Report for PCT/2015/036512, mailed Jan. 28, 2016.

Kishihara et al. "Preparation of imidazole-free caramel color through hollow fiber module ultrafiltration," Nippon Nogeikagaku kaishi. Journal of the Agricultural Chemical Society of Japan, vol. 53, No. 9, pp. 305-311, 1979.

Kishihara et al. "Release of Bound Imidazoles in Caramel Color (Ultrafiltration of Caramel Color Part IV)," Nippon Nogeikagaku kaishi. Journal of the Agricultural Chemical Society of Japan, vol. 53, No. 8, pp. 273-275, 1979.

Uemera et al. "Present State and Prospective of Reverse Osmosis and Nano-Filtration Membranes," Membrane, 35 (5), pp. 233-238, 2008.

Hiroki et al. "Membrane Technology for Solving the Global Water Issue," IPEJ Journal vol. 27, No. 1, pp. 26-29, 2015.

\* cited by examiner

*Primary Examiner* — Jenna A Watts
(74) *Attorney, Agent, or Firm* — King & Spalding

(57) ABSTRACT

The present invention provides a method for forming caramels having reduced low molecular weight species such as 4-MeI. The low-4-MeI caramels produced by this method have improved stability and taste relative to those known in the art. The invention also extends to the caramels produced by the disclosed methods and the use of such caramels in food and beverages.

12 Claims, No Drawings

US 11,980,206 B2

METHOD FOR REDUCING LOW MOLECULAR WEIGHT SPECIES IN CARAMEL

RELATED APPLICATIONS

This application is divisional application of U.S. patent application Ser. No. 15/320,095, filed Dec. 19, 2016, which is a national phase application under 35 U.S.C. § 371 of International Application No. PCT/US2014/036512, filed on Jun. 18, 2015, which application claims the benefit of U.S. Provisional Patent Application No. US 62/013,896, filed on Jun. 18, 2014, and U.S. Provisional Patent Application No. US 62/019,648, filed on Jul. 1, 2014. The complete disclosure of each of the above-identified applications is fully incorporated herein by reference.

FIELD OF THE ART

The present invention relates to methods of reducing the amount of low molecular weight species in caramel color, as well as the caramels resulting from such methods. The disclosed methods can be used alone or in combination. The present invention also extends to methods using the caramels in the preparation of beverages, as well as to beverages containing the caramels.

BACKGROUND OF THE INVENTION

Caramel colors are colorants widely used in food and beverages. Ranging in color from pale-yellow to dark-brown, caramel colors are prepared commercially from food grade nutritive carbohydrate sweeteners (glucose and fructose and/or polymers thereof, e.g., sugar, corn-syrup and starch hydrolyzates) by controlled heating of these materials to generate desired degrees of unsaturation, polymerization and color.

An identity scheme proposed by the International Technical Caramel Association (ITCA) classifies caramel colors according to four general "Classes," based on their method of manufacture, composition, functional properties and applications. Ten specific "Types" are also identified, based upon their color intensity.

In caramel colors that utilize ammonia as a reactant, 4-methyl-imidazole (4-MeI) is produced. It is generally preferable, however, to form as little 4-MeI as possible.

U.S. Patent Application Publication No. 2010/0003383 (Parker et al.) describes a method of making a low-4-MeI caramel by reacting a carbohydrate with ammonium bisulfite and water at an initial pH of less than 5. The reactant mixture of carbohydrate, ammonium bisulfite, acid and water is then heated in a closed vessel to a temperature and for a time sufficient to initiate the caramel reaction. The rate of the reaction is then controlled by subsequently adding base in a controlled manner to maintain a desired low pH. However, the caramels produced by this method have unusual gelling properties, rendering such caramels unsuitable for commercial use.

U.S. Pat. No. 4,416,700 describes caramel color concentrates prepared by subjecting a mixture of caramel color and water to ultrafiltration through a semi-permeable membrane, wherein the pH and/or ionic strength of the caramel color/water mixture, at all or particular stages of the ultrafiltration process, is regulated so as to obtain desirable processing and product attributes, such as increased removal of low molecular weight materials.

U.S. Pat. No. 5,114,492 relates to the separation of color solids from caramelized carbohydrate solutions by the use of ultrafiltration, and more particularly, to a continuous process for separation of these solids into a color fraction and a non-color fraction with recycle of the non-color fraction to produce color bodies having an acceptable flavor for use in beverages or food. In particular, the '492 patent discloses a molecular weight cut off (MWCO) of at least about 10,000 Daltons and higher.

There remains a need for novel methods of producing stable, i.e., non-gelling, low-4-MeI, class IV caramels. There also remains a need for novel methods of reducing low molecular weight species in caramels, more generally.

SUMMARY OF THE INVENTION

The present invention relates to methods of reducing the amount of low molecular weight species in caramel colors (e.g., 4-MeI), as well as the caramels produced by such methods and the use of such caramels in food and beverages, such as sodas. The methods include synthesis methods and filtration methods, which may be used alone or in combination. Advantageously, the methods of synthesis produce low-4-MeI class IV caramels that have improved stability and taste relative to low-MeI caramels known in the art. Advantageously, the methods of filtration use less water than methods known in the art.

In general, the present invention provides a method of forming a low-4-MeI class IV caramel, comprising (i) providing a solution that comprises a carbohydrate and an acid; (ii) initiating a caramelization reaction in the solution; (iii) after initiation, adding a portion of ammonium and sulfite to solution; and (v) continuing the caramelization reaction, thereby producing a low-4-MeI class IV caramel. In exemplary embodiments, the caramelization reaction in (ii) is initiated by heating the solution to a temperature of at least about 80° C., or more particularly, about 100° to about 110° C. In exemplary embodiments, the caramelization reaction in (ii) is initiated by adding a first portion of ammonium and sulfite to the solution and heating the solution to a temperature of at least about 80° C., or more particularly, about 100° to about 100° C., wherein the solution is contained within a reaction vessel that is closed prior to the addition of the first portion of ammonium and sulfite. In exemplary embodiments, the ammonium and sulfite is added continuously in (iii).

In a first aspect, the present invention is a method of making a low-4-MeI class IV caramel, comprising (i) adding a carbohydrate and an acid to a reaction vessel to provide a first reaction mixture; (ii) closing the reaction vessel; (iii) adding a first portion of ammonium and sulfite to the first reaction mixture to provide a second reaction mixture; (iii) heating the second reaction mixture to a suitable temperature; (iv) adding a second portion of ammonium and sulfite to the second reaction mixture to provide a third reaction mixture; and (v) maintaining the temperature of step (iv) or heating the third reaction mixture to a temperature greater than the temperature of step (iv), to provide a low-4-MeI class IV caramel. In some embodiments, the process is a batch process.

In exemplary embodiments, the first portion of ammonium and sulfite is equal to or less than the second portion of ammonium sulfite.

In exemplary embodiments, the first portion of ammonium and sulfite is about 1 to about 50% of the total amount of ammonium and sulfite used in the method, and more particularly about 10, about 20, about 30, about 40 or about 50% of the total amount of ammonium and sulfite used in the method.

In exemplary embodiments, the second reaction mixture is heated in (iii) to a temperature of at least about 80° C., or more particularly, between about 100° C. and 110° C.

In exemplary embodiments, the third reaction mixture is maintained in (v) at a temperature of at least about 80° C., or more particularly, between about 100° C. and about 110° C.

In exemplary embodiments, the third reaction mixture is heated in (v) to a temperature of at least about 100° C., or more particularly, between about 100° and 110° C., or even more particularly, between 110° C. and 130° C. In exemplary embodiments, the third reaction is heated in (v) to between about 115° and about 125° C., or about 125° C. In exemplary embodiments, the third reaction mixture is heated in (v) to between about 110° and 130° C., or about 130° C.

In exemplary embodiments, the second portion of ammonium and sulfite is added continuously in (iv).

In exemplary embodiments, the pH of the reaction mixture is maintained between about 1.2 and about 3.0, or more particularly, between about 1.5 and about 1.8.

In exemplary embodiments, the low-4-MeI class IV caramel produced by the methods of the present invention comprises less than about 15 ppm 4-MeI, or less than about 5 ppm, or less than about 1 ppm. In certain embodiments, the low-4-MeI class IV caramel produced by the methods of the present invention comprises less than 0.9 ppm, or less than about 0.8 ppm, or less than about 0.7 ppm, or less than about 0.6 ppm, or less than about 0.5 ppm, or less than about 0.4 ppm, or less than about 0.3 ppm, or less than about 0.2 ppm, or less than about 0.1 ppm 4-MeI. In exemplary embodiments, the class IV caramel produced by the methods of the present invention is a zero 4-MeI caramel.

In exemplary embodiments, the low-4-MeI class IV caramel is stable for at least about 6 months, at least about 10 months, at least about 12 months, or at least about 18 months or more. The carbohydrate may be any suitable carbohydrate. In one embodiment, the carbohydrate is glucose or glucose syrup. In another embodiment, the carbohydrate is a fructose-containing carbohydrate, such as sucrose.

In exemplary embodiments, the low-4-MeI class IV caramel is derived from fructose-containing carbohydrate, such as sucrose, and is stable for a least about 6 months or more particularly, at least about 10 months.

The method may comprise one or more additional steps. For example, low-4-MeI caramel may be further processed to further reduce the amount of 4-MeI in the low-4-MeI caramel and/or obtain a desired color intensity. In exemplary embodiments, the method further comprises subjecting the low-4-MeI class IV caramel to further processing by filtration, concentration or a combination thereof.

In a second aspect, the present invention is a method of reducing the low molecular weight component of a caramel solution, comprising: (i) providing a solution comprising a caramel selected from a class III or class IV caramel; (ii) subjecting the solution to diafiltration to provide a retained fraction and a permeated fraction, said retained fraction comprising high molecular weight color bodies and water; (iii) subjecting the permeate fraction to reverse osmosis to provide a recycle water stream and a permeate concentrate stream; (iv) adding the retained fraction and recycle water stream to the caramelized solution; and (v) repeating steps (ii)-(v) one or more times to provide a concentrated, purified low-4-MeI class III or class IV caramel.

In exemplary embodiments, the method is repeated until a concentrated, purified low-4-MeI class III or class IV caramel that comprises less than about 15 ppm 4-MeI is produced.

In exemplary embodiments, the method is repeated for between about 3 and about 10 hours, or more particularly, about 6 hours.

In exemplary embodiments, the method permits an at least five (5) fold reduction in the use of water compared to prior art methods. In exemplary embodiments, the method permits an at least ten (10) fold reduction in the use of water.

In exemplary embodiments, the method produces a concentrated, purified low-4-MeI class III or class IV caramel that comprises less than about 15 ppm 4-MeI, or less than about 5 ppm, or less than about 1 ppm. In certain embodiments, the method produces a concentrated, purified low-4-MeI class III or class IV caramel that comprises less than 0.9 ppm, or less than about 0.8 ppm, or less than about 0.7 ppm, or less than about 0.6 ppm, or less than about 0.5 ppm, or less than about 0.4 ppm, or less than about 0.3 ppm, or less than about 0.2 ppm, or less than about 0.1 ppm 4-MeI. In exemplary embodiments, the method produces a concentrated, purified low-4-MeI class III or class IV caramel that has no detectable 4-MeI.

The class III or class IV caramel subjected to the method may be a single strength caramel, a double strength caramel or a low-4-MeI caramel. In a particular embodiment, the caramel subjected to the method is a low-4-MeI caramel synthesized by a method described herein.

In exemplary embodiments, the caramelized solution comprises a class III or class IV caramel and process water in a volume dilution of about 1:1.

In exemplary embodiments, diafiltration is carried out at a temperature between about 60° F. and about 95° F. In a particular embodiment, diafiltration is carried out at a temperature of about 80° F. In exemplary embodiments, diafiltration comprises a molecular weight cut off (MWCO) of about 800, or more particularly, about 700, or even more particularly, about 600.

In exemplary embodiments, the pH of the caramel solution during diafiltration is greater than about 7.5, and more particularly, greater than about 7.8, and the temperature is between about 60° C. and about 95° F., or more particularly, about 80° F.

In exemplary embodiments, diafiltration is conducted in constant pressure mode until the permeate concentration stream is about 1 brix and thereafter, in constant flux mode.

In a third aspect, the present invention is a low-4-MeI caramel obtained using the methods disclosed herein, either alone or in combination.

In exemplary embodiments, the present invention is a low-4-MeI class IV caramel obtained using the synthesis method disclosed herein comprising less than about 15 ppm, or less than about 10 ppm, or less than about 5 ppm, or less than about 1 ppm MeI. In exemplary embodiments, the caramel is obtained by use of the synthesis methods disclosed and comprises less than about 0.9 ppm, 0.8 ppm, 0.7 ppm, 0.6 ppm, 0.5 ppm, 0.4 ppm, 0.3 ppm, 0.2 ppm, or 0.1 ppm 4-MeI. In exemplary embodiments, the caramel comprises less than about 15 ppm of MeI and is stable for at least about 6 months, or at least about 10 months, or at least about 12 months, or at least about 18 months. In exemplary embodiments, the caramel is derived from a fructose-containing carbohydrate and has a stability of at least about 6 months, or preferably, at least about 10 months.

In exemplary embodiments, the caramel is a low-4-MeI class IV caramel obtained using the synthesis method disclosed herein in combination with the filtration method disclosed herein. In a particular embodiment, the caramel is obtained by use of the synthesis and filtration methods disclosed herein, in combination, and comprises less than about 15 ppm MeI, or less than about 10 ppm, or less than about 5 ppm, or less than about 1 ppm MeI. In exemplary embodiments, the caramel is obtained by use of the synthesis and filtration methods disclosed herein, in combination, and comprises less than about 0.9 ppm, 0.8 ppm, 0.7 ppm, 0.6 ppm, 0.5 ppm, 0.4 ppm, 0.3 ppm, 0.2 ppm, or 0.1 ppm 4-MeI. In exemplary embodiments, the caramel comprises less than about 15 ppm of MeI and is stable for at least about 6 months, or at least about 10 months, or at least about 12 months, or at least about 18 months. In exemplary embodiments, the caramel is derived from a fructose-containing carbohydrate and has a stability of at least about 6 months, or preferably, at least about 10 months.

In exemplary embodiments, the caramel is a low-4-MeI concentrated, purified class III or class IV caramel obtained using the filtration method disclosed herein. In a particular embodiment, the caramel comprises less than about 15 ppm of MeI, less than 10 ppm, or less than 5 ppm, or less than 1 ppm 4-MeI. In exemplary embodiments, the caramel is obtained by use of the filtration methods disclosed herein and comprises less than about 0.9 ppm, 0.8 ppm, 0.7 ppm, 0.6 ppm, 0.5 ppm, 0.4 ppm, 0.3 ppm, 0.2 ppm, or 0.1 ppm 4-MeI. In exemplary embodiments, the caramel comprises less than about 15 ppm of MeI and is stable for at least about 6 months, or at least about 10 months, or at least about 12 months, or at least about 18 months.

In exemplary embodiments, the present invention is a class IV caramel made from glucose or glucose syrup and obtained using the methods disclosed herein, comprising less than about 15 ppm 4-MeI and stable for at least about 12 months and more particularly, about 18 months or more.

In exemplary embodiments, the present invention is a class IV caramel made from a fructose-containing carbohydrate (e.g., sucrose) and obtained using the methods disclosed herein, comprising less than about 15 ppm of 4-MeI and stable for at least about 6 months and more particularly, about 10 months.

In a fourth aspect, the present invention is a method of making a low-4-MeI food or beverage, comprising adding the low-4-MeI caramel obtained by the methods disclosed herein to a food or beverage matrix. In exemplary embodiments, the beverage is a soft drink.

In exemplary embodiments, the present invention is a food or beverage comprising the low-4MeI caramel disclosed herein. In one embodiment, the food or beverage comprises less than about 15 ppm of MeI, or less than about 10 ppm, or less than about 5 ppm, or less than about 1 ppm MeI. In exemplary embodiments, the food or beverage comprises less than about 0.9 ppm, 0.8 ppm, 0.7 ppm, 0.6 ppm, 0.5 ppm, 0.4 ppm, 0.3 ppm, 0.2 ppm, or 0.1 ppm 4-MeI. In certain embodiments, the beverage is a soft drink, e.g., a cola.

DETAILED DESCRIPTION

The present invention provides a low-4 methyl-imidazole caramel, as well as methods of making and using the same. The present invention also extends to caramels having reduced amounts of other low molecular weight species, as well as methods of using such caramels in the production of food and beverages, and the food and beverages so produced.

Caramel colors (or caramels) are foods colorants used to impart brown color of varying shade and intensity to food and beverages. Caramel color is generally manufactured by heating carbohydrates, either alone or in the presence of acids, alkalis, and/or salts. It is used in one of the oldest and most widely-used food colorings, and is found in almost every kind of industrially produced food, including batters, beer, brown bread, buns, chocolate, cookies, cough drops, dark liquor such as brandy, rum, and whisky, chocolate flavored flour-based confectionery, coatings, custards, decorations, fillings and toppings, potato chips, dessert mixes, doughnuts, fish and shellfish spreads, frozen desserts, Fruit preserves, glucose tablets, gravy browning, ice cream, pickles, sauces (e.g., soy sauce) and dressings, sodas (especially colas), sweets, vinegar, and wines.

Caramel colors differ in their composition and characteristics. There are four recognized classes (I-IV) based on the reactants used in their manufacture. Caramel I (also known as plain caramel, caustic caramel, spirit caramel) is commonly used in whiskey and other high proof alcohols. Caramel II (also known as caustic sulfite caramel) is commonly used in cognac, sherry and some vinegars. Caramel III (also known as ammonia caramel, baker's caramel, confectioner's caramel, beer caramel) is commonly used in beer, sauces, and confectionery. Caramel IV (also known as sulfite ammonia, soft drink caramel, or acid proof caramel) is commonly used in acid environments, such as soft drinks (sodas)(e.g., colas) and dark beers. Of the various caramel colors, class IV caramel colors are the most widely produced and are available commercially as liquids or powders.

Both caramel III and caramel IV are prepared in the presence of ammonium compounds, resulting in the formation of 4-methyl imidazole (4-MeI, also known as 4-MI) and other low-molecular weight species. It may be desired to limit the formation of low-molecular weight species, including 4-MeI. Generally, low molecular weight species include those having a molecular weight (Daltons) of less than 800.

The present invention provides methods for making class IV caramels (i.e., synthesis methods) that limit the formation of low-molecular weight species, such as 4-MeI. The present invention also provides methods for filtering class III or class IV caramels to reduce the amount of low molecular weight species therein, such as 4-MeI. With respect to class IV caramels, these methods may be used alone or in combination. When used in combination, the filtration methods are used to further reduce the amount of low-molecular weight species.

In one embodiment, the methods of the present invention provide a class III or IV caramel that has a reduced amount of low molecular species (e.g., 4-MeI), compared to "conventional" class III or class IV caramels, i.e., caramels produced without regard to the formation of 4-MeI and/or other low molecular weight species. Generally, "conventional" class III or IV caramels have a 4-MeI concentration of greater than 100 ppm. "Low 4-MeI caramel" is generally considered to have a 4-MeI concentration of less than 100 ppm. In certain embodiments, the methods of the present invention provide a caramel having a 4-MeI concentration of less than about 50 ppm, or less than 20 ppm, or less than about 10 ppm, or less than about 5 ppm, or less than about 1 ppm 4-MeI. In certain embodiments, the methods of the present invention provide a caramel having a 4-MeI concentration less than about 0.9 ppm, less than about 0.8 ppm, less than about 0.7 ppm, less than about 0.6 ppm, less than about 0.5 ppm, less than about 0.4 ppm, less than about 0.3 ppm, less than about 0.2 ppm, or less than about 0.1 ppm 4-MeI. In certain embodiments, the methods of the present invention provide a zero 4-MeI caramel, i.e., no 4-MeI is detectable with current analytical capabilities.

In another embodiment, the methods of the present invention provide a class III or IV caramel that has a reduced amount of 4-MeI compared to prior art methods of producing low-4-MeI caramels. In exemplary embodiments, the synthesis method of the present invention does not comprise addition of base to the caramelization reaction. In exemplary embodiments, the filtration method of the present invention does not comprise absorption. In exemplary embodiments, the synthesis method of the present invention reduces the amount of 4-MeI compared to prior art method of producing low-4-MeI caramels but without negatively impacting taste and/or stability. In exemplary embodiments, the methods of the present invention provide low-4-MeI caramels have superior taste and stability compared to caramels known in the art.

In another embodiment, the methods of the present invention provide a class III or class IV caramel that has a reduced amount of other low molecular weight species compared to conventional class III or class IV caramels. These include, without limitation, species having a molecular weight of less than about 800, less than about 700 or less than about 600 Daltons. In exemplary embodiments, low molecular weight species include 2-methylimidazole (2-MEI), 5-hydroxy methyl furfural (5-HMF), 5-hydroxy 2-methyl pyridine, 2-hydroxy pyridine and 2-hydroxy 6-methylpyridine carboxylic acid.

In one embodiment, the methods of the present invention provide a class III or class IV caramel wherein the amount of low molecular weight species has been reduced by about 5%, about 10%, about 15%, about 20%, about 25%, about 30%, about 30%, about 35%, about 40%, about 45%, about 50%, about 55%, about 60%, about 65%, about 70%, about 75%, about 80%, about 85%, about 90%, about 95% or about 99% as compared to conventional class III or class IV caramels.

In another embodiment, the methods of the present invention provide a class III or class IV caramel wherein the amount of low molecular weight species has been reduced by 5%, about 10%, about 15%, about 20%, about 25%, about 30%, about 30%, about 35%, about 40%, about 45%, about 50%, about 55%, about 60%, about 65%, about 70%, about 75%, about 80%, about 85%, about 90%, about 95% or about 99% as compared to prior art methods to produce class III or class IV caramels having a reduced amount of low molecular weight species.

In another embodiment, the methods of the present invention provide a class III or class IV caramel in which about 10% or less, about 5% or less or about 3% or less of solids are low molecular weight species.

Advantageously, the filtration methods disclosed herein use less water than prior art methods. In exemplary embodiments, the filtration methods use about 50% or less water, or about 40%, or about 30% or about 20%, or about 10% less, or about 5% less water. In exemplary embodiments, the amount of water is reduced five (5) to ten (10)-fold over known methods. In certain embodiments, the amount of water is reduced at least 5, at least 6, at least 7, at least 8, at least 9, or at least 10 fold or more compared to methods known in the art.

I. Synthesis Method

The present invention provides a method of making class IV caramel that reduces the amount of low molecular weight species, such as 4-MeI, premised on the realization that low molecular weight species can be reduced by adding at least a portion of the ammonium and sulfite after the caramelization reaction has been initiated. In exemplary embodiments, all of the ammonium and sulfite used in the method is added after the caramelization reaction has been initiated. In exemplary embodiments, a portion of the ammonium and sulfite used in the reaction are added after the caramelization reaction has been initiated, wherein the specific amount may be varied according to embodiments described herein.

In one aspect, the present invention provides methods of making a class IV caramel having a reduced amount of low molecular weight species, e.g., 4-MeI, relative to caramels prepared by conventional means. In one embodiment, the method provides methods of making a class IV caramel having a reduced amount of low molecular weight species, e.g., 4-MeI, relative to class IV caramels prepared by conventional methods. In certain embodiments, the class IV caramel produced by such methods has about 50 ppm or less 4-MeI, or about 20 ppm or less, or about 15 ppm or less, or about 5 ppm or less, or about 1 ppm or less 4-MeI. In certain embodiments, the class IV caramel produced by such methods has about 0.9 ppm or less, 0.8 ppm or less, 0.7 ppm or less, 0.6 ppm or less, 0.5 ppm or less, 0.4 ppm or less, 0.3 ppm or less, 0.2 ppm or less, 0.1 ppm or less 4-MeI. In certain embodiments, the class IV caramel produced by such methods is a zero-4-MeI class IV caramel, i.e., a class IV caramel having no detectable 4-MeI.

The class IV caramel can optionally be subjected to one or more additional steps following the synthesis method to further reduce the amount of 4-MeI, such as filtration or concentration or both. In one embodiment, the class IV caramel is subjected to the filtration method described in Section II, below. Adding the filtration step may, in certain embodiments, produce a concentrated purified low 4-MeI class IV caramel containing an amount of 4-MeI that is reduced relative to the low-4-MeI class IV caramel resulting from synthesis and/or a desired color intensity. In certain embodiments, carrying out the supplemental filtration step following synthesis reduces the amount of 4-MeI by about 100-fold to 1000-fold. In a particular embodiment, carrying out the supplemental filtration step reduces the amount of 4-MeI by at least about 100, about 200, about 300, about 400, about 500, about 600, about 700, about 800, about 900 or about 1000-fold. In a particular embodiment, carrying out the additional filtration step following the synthesis method provides a concentrated, purified low-4-MeI caramel containing about 1.0 ppm 4-MeI, or more particularly, about 0.1 ppm, 4-MeI.

In exemplary embodiments, the caramel is caramel IV and the reactants comprise a carbohydrate, an acid and a source of sulfite and ammonium, wherein at least a portion of the sulfite and ammonium is added after the caramelization reaction has begun. When ammonium and sulfite are added after the reaction has begun, they may be added by any suitable means, e.g., a high pressure pump.

Caramel color is the product of heat treatment of carbohydrates, typically sugars, commonly in the presence of a catalyst. Upon heating, the carbohydrates break down and reform into compounds with a characteristic flavor and color. More specifically, fragmentation reactions result in low-molecular-weight compounds that may be volatile and may contribute to flavor. Polymerization reactions lead to larger-molecular-weight compounds that contribute to the dark-brown color.

Generally, the synthesis method begins by dissolving the carbohydrate into a solution of water, to which acid is then added. The acid may be any suitable acid. These include, for example, phosphoric acid, sulfuric acid, sulfurous acid, acetic acid, citric acid and/or me so-tartaric acid, or salts or combinations thereof. In a particular embodiment, the acid is phosphoric acid (0-8% w/w dry carbohydrate) alone or in combination with sulfuric acid. In another particular embodiment, the acid is citric acid (0-20%), alone or in combination with acetic acid (0-1%).

Alternatively, the carbohydrate may be dissolved into a solution of water and acid. In a particular embodiment, the carbohydrate is provided as about 50 to about 80% dissolved solids.

The ammonium and sulfite are then added to the carbohydrate and acid mixture. Ammonium and sulfite may be provided in any suitable form. In one embodiment, the source of ammonium and sulfite is an ammonium sulfite. In another embodiment, ammonium and sulfite are provided separately in the form of an ammonia and a sulfite salt.

Ammonium sulfites include, but are not limited to, consisting of ammonium bisulfite, potassium metabilsulfite, sodium metabilsulfite and ammonium citrate, or combinations thereof.

In a particular embodiment, ammonium and sulfite are provided as ammonium bisulfite (ABS). In one embodiment, ammonium bisulfite is provided as an aqueous solution containing 35-75% or more particularly, about 60-70% ammonium bisulfite. The ratio of ammonium to sulfite may vary. In one embodiment, the molar ratio of ammonia to sulfite is about 1:3. In exemplary embodiments, the molar ratio of ammonia to sulfite is about 1:1, about 1:2, about 1:2.5, about 1.3, about 1:3.5, about 1:4 to about 1:5. The pH of the ammonium bisulfite solution may vary. In one embodiment, the pH ranges from about 5 to about 6, or about 5.3 to about 5.9 or more particularly, about 5.5.

In one embodiment, ammonium is added in the form of ammonium metabisulfite, ammonium sulfite, di-ammonium phosphate, NH4OH or ammonium gas (used in 0-6% w/w dry carbohydrate).

In another embodiment, sulfite is added in the form of sodium sulfite, sodium metabisulfite, potassium sulfite, potassium metabisulfite or sulfer dioxide gas (used 0-20% w/w dry carbs).

In a particular embodiment, ammonium bisulfite is added together with second sulfite (e.g., potassium or sodium metabisulfite) and/or ammonia salts (e.g., ammonium citrate). Alternatively, the ammonium bisulfite is pre-mixed with a second sulfite and/or ammonia salt and then added.

In one embodiment, ABS is pre-mixed with a non-ammonia sulfite and then added to the reaction.

In a particular embodiment, ammonium bisulfite is added together with sodium metabisulfite.

The entire amount of ammonium and sulfite may be added at the same time, or may be added in portions. When the ammonium and sulfite is added in portions, the amount added in a particular portion may vary. For example, if the ammonium and sulfite is added in two portions, the first portion may be larger than, smaller than or equal to the second portion. Similarly if the ammonium and sulfite is added in three or more portions, the portions may be the same size or different sizes. A portion may be added continuously.

In some embodiments, a portion of the ammonium and sulfite is added before the reaction begins, with the remaining ammonium and sulfite added after the reaction has begun. The portion added before the reaction is begun may be added in one or more discrete portions, or continuously. In exemplary embodiments, the portion of ammonium and sulfite added before the reaction is initiated (i.e., the first portion) is equal to the portion of ammonium and sulfite added after the reaction is initiated (i.e., the second portion or the remaining portions, if more than one). In exemplary embodiments, the portion of ammonium and sulfite added before the reaction is initiated is less than the portion of ammonium and sulfite added after the reaction is initiated. In certain embodiments, about 1 to about 50% of the ammonium and sulfite to be added is added before the reaction is initiated. In certain embodiments, about 1 to about 5%, about 5 to about 10%, about 15 to about 20%, about 20 to about 25%, about 25 to about 30%, about 30 to about 35%, about 35 to about 40%, about 40 to about 45%, or about 45 to about 50% of the ammonium and sulfite to be added is added before the reaction is initiated. In exemplary embodiments, about 5%, about 10%, about 15%, about 20%, about 25%, about 30%, about 35%, about 40%, about 45% or about 50% of the ammonium and sulfite to be added is added before the reaction is initiated.

In other embodiments, the entire amount of ammonium and sulfite to be added is added after the reaction has begun. The ammonium and sulfite added after the reaction begins may be added in one or more discrete portions, or continuously.

As would be understood by one of skill in the art, a caramelization reaction is initiated by heating a solution containing a carbohydrate to a suitable temperature, either alone or in the presence of co-factors (e.g., ammonium). In exemplary embodiments, the reaction vessel is closed and controlled heat and pressure are applied to initiate the reaction. In exemplary embodiments, heat is applied continuously throughout the reaction, i.e., uninterrupted.

In exemplary embodiments, the method of the present invention comprises a caramelization reaction initiated by heating the solution comprising a carbohydrate and acid to a temperature of at least about 80°, at least about 90°, or at least about 100° C. In exemplary embodiments, the caramelization reaction is initiated by heating the solution comprising a carbohydrate and acid to between about 80° and about 90° C., or between about 100° and 110° C. In exemplary embodiments, the caramelization reaction is initiated by heating the solution comprising a carbohydrate and acid to a temperature of about 80°, about 90°, or about 100° C.

Caramelization reactions are also sensitive to the chemical environment. By controlling the pH, the reaction rate can be altered. The rate of caramelization is generally lowest at near-neutral acidity (pH around 7), and accelerated under both acidic (especially pH below 3) and basic (especially pH above 9) conditions. In exemplary embodiments, the method of the present invention is carried out under acid conditions. In certain embodiments, the pH of the reaction mixture is maintained between about 1.2 and about 3.0, or more particularly, between about 1.5 and about 1.8. In one embodiment, the pH of the reaction mixture is between about 1.2 and about 3.0, or more particularly, about 1.2 and about 2.0, and even more particularly, about 1.5 and about 1.8. In a particular embodiment, the pH of the reaction mixture is about 1.2, about 1.3, about 1.4, about 1.5, about 1.6, about 1.7 or about 1.8.

In a particular embodiment, the pH of the reaction mixture is maintained between 1.2 and about 2.0 by the addition of NaOH, KOH or Na4OH. In a particular embodiment, the pH of the reaction mixture is maintained between 1.2 and 2.0 by the addition of a 50% solution of KOH.

Caramelization reactions may be carried out in closed or open reaction vessels. In an exemplary embodiment, the reaction vessel used in the method of the present invention is closed.

Generally, the present invention provides a synthesis method for forming a low-4-MeI caramel, the method comprising (i) providing a solution comprising a carbohydrate and an acid; (ii) initiating a caramelization reaction; (iii) adding ammonium and sulfite to the caramelization reaction; and (iv) continuing the caramelization reaction, thereby producing a low-4-MeI caramel. In exemplary embodiments, all ammonium and sulfite to be used in the method are added after the caramelization reaction has initiated, i.e., after (ii). In exemplary embodiments, at least a portion of the ammonium and sulfite to be utilized in the method is added before the caramelization reaction has begun, i.e., before step (ii).

In exemplary embodiments, the reaction is initiated by heating the solution to a suitable temperature, and more particularly, a temperature of at least about 80° C. or more particularly, between about 100° C. and about 110° C. In certain embodiments, the solution is heated in (ii) to about 80°, about 85°, about 90°, about 95°, about 100°, about 105°, about 110° or about 115°.

In exemplary embodiments, the reaction is initiated by adding a first portion of ammonium and sulfite to the solution, wherein the solution is provided in a reaction vessel that can be sealed, and then sealing the reaction vessel and heating the solution to an a suitable temperature, and more particularly, a temperature of at least about 80° C., or more particularly, between about 100° C. and about 110° C. In certain embodiments, the solution is heated in (ii) to about 80°, about 85°, about 90°, about 95°, about 100°, about 105°, about 110° or about 115°.

In exemplary embodiments, the ammonium and sulfite in added continuously in (iii).

In one aspect, the present invention is a method of making a low-4-MeI class IV caramel, comprising (i) adding a carbohydrate and an acid to a reaction vessel to provide a first reaction mixture; (ii) closing the reaction vessel; (iii) adding a first portion of ammonium and sulfite to the first reaction mixture to provide a second reaction mixture; (iv) heating the second reaction mixture to a suitable temperature; (v) adding a second portion of ammonium and sulfite to the second reaction mixture to provide a third reaction mixture; and (vi) maintaining the temperature of step (iv) or heating the third reaction mixture to temperature higher than step (iv) to provide a low-4-MeI class IV caramel. In some embodiments, the reaction is a batch process. Optionally, step (vi) can begin before step (iv) is complete, i.e., the reaction mixture may be heated to a higher temperature before the addition of the second portion of ammonium and sulfite is complete. In exemplary embodiments, the majority of the second portion of ammonium and sulfite is added after the temperature has been increased. In exemplary embodiments, the majority of the second portion of ammonium and sulfite is added before the temperature is increased. In exemplary embodiments, the second portion of ammonium and sulfite is added continuously.

In exemplary embodiments, the second reaction mixture is heated in (iv) to at least about 80° C. In exemplary embodiments, the second reaction mixture is heated in (iv) to about 80° C., or about 85° C., or about 90° C., or about 95° C., or about 100° C., or about 105° C., or about 110° C., or about 115° C. In exemplary embodiments, the second reaction mixture is heated in (iv) to between about 100° and 110° C.

In exemplary embodiments, closing the reaction vessel increases the pressure by at least 10, or at least 20 or at least 30, or at least 40 or at least 50 or about 60 or less psi, in some instances between 10 and 100 psi, or between 20 and 80 psi, or between 30 and 60 psi.

In exemplary embodiments, the first portion of ammonium and sulfite is equal to or less than the second portion of ammonium and sulfite. In exemplary embodiments, the first portion of ammonium and sulfite is about 1 to about 50% of the total amount of ammonium and sulfite used in the method, or more particularly, about 30% of the total amount of ammonium and sulfite used in the reaction, or even more particularly, about 5%, about 10%, about 15%, about 20%, about 25%, about 30%, about 40%, about 45%, or about 50% of the ammonium and sulfite used in the method.

Alternatively, the ratio of the first portion of ammonium and sulfite to the second portion of ammonium and sulfite is about 1:1, about 1:1.5, about 1:2, about 1:2.5, about 1:3, about 1:3.5, about 1:4, about 1:4.5, about 1:5, about 1:5.5, about 1:6, about 1:6.5, about 1:7, about 1:7.5, about 1:8, about 1:8.5, about 1:9, about 1:9.5 or about 1:10.

In an exemplary embodiment, the present invention is a method of forming a low-4-MeI class IV caramel, the method comprising: (i) adding a carbohydrate and an acid to a reaction vessel to provide a first reaction mixture; (ii) closing the reaction vessel; (iii) adding a first portion of ammonium and sulfite to the first reaction mixture to provide a second reaction mixture; (iv) heating the second reaction mixture to a temperature at least about 80° C., or more particularly, between about 100° C. to about 110° C.; (v) adding a second portion of ammonium and sulfite to the second reaction mixture to provide a third reaction mixture; and (vi) continuing the caramelization reaction by maintaining the temperature of the reaction mixture at least about 80° C., or more particularly, between about 100° C. to about 110° C. or heating the reaction mixture to a temperature above at least 110° C., or more particularly, between about 110° C. and about 130° C., thereby forming the low-4-MeI class IV caramel. In exemplary embodiments, the first portion of ammonium sulfite is equal to or less than the second portion of ammonium and sulfite. In exemplary embodiments, the first portion of ammonium sulfite is about 30% of the total amount of ammonium and sulfite used in the method.

Optionally, the first or second reaction mixture is pre-heated, i.e., subject to an initial heating step before step (ii). In a particular embodiment, the pre-heating temperature is between about 60 and about 120° C., or more particularly, between about 60 and about 110° C., and even more particularly, between about 100° and about 110° C. In exemplary embodiments, the first or second reaction mixture is pre-heated to about 100° C. In other exemplary embodiments, the first or second reaction mixture is pre-heated to about 110° C.

A wide variety of different carbohydrates or carbohydrate mixtures can be used in practicing the synthesis method of the present invention. These include, for example, glucose, glucose syrup or a fructose-containing carbohydrate (e.g., sucrose, inverted sugar, HFCS).

In an exemplary embodiment, the method of the present invention comprises (i) providing a solution (i.e., a first reaction mixture) comprising glucose and an acid in a reaction vessel; (ii) closing the reaction vessel; (iii) adding first portion of ammonium and sulfite to the first reaction mixture to provide a second reaction mixture; (iv) heating the second reaction mixture to a temperature of at least about 80° C.; and (v) adding a second portion of ammonium and sulfite to the second reaction mixture; and (vi) continuing the caramelization reaction, to provide a low-4-MeI class IV caramel. In exemplary embodiments, the first portion of ammonium and sulfite is equal to or less than the second portion of ammonium and sulfite. In exemplary embodiments, the first portion of ammonium and sulfite is between about 1 and about 50% of the total amount of ammonium and sulfite used in the method, and more particularly, about 30%. In exemplary embodiments, the second reaction mixture is heated to a temperature of between about 100° to about 110° C. In exemplary embodiments, the reaction is continued in step (vi) by either maintaining the reaction at the temperature of (iv), or by heating the reaction mixture to temperature higher than step (iv), i.e. to a temperature greater than about 110° C., or more particularly, about 130° C. Optionally, the solution is pre-heated prior to step (ii). In exemplary embodiments, the pH of the reaction mixture is maintained between about 1.2 and about 3.0, more particularly, about 1.5 and about 1.8.

In an exemplary embodiment, the method of the present invention comprises (i) providing a solution (i.e., a first reaction mixture) comprising glucose syrup and an acid in a reaction vessel; (ii) closing the reaction vessel; (iii) adding ammonium and sulfite to the first reaction mixture to provide a second reaction mixture; (iv) heating the second reaction mixture to a temperature suitable to a temperature of at least about 80° C.; (v) adding a second portion of ammonium and sulfite to the second reaction mixture; and (vi) continuing the caramelization reaction, to provide a low-4-MeI class IV caramel. In exemplary embodiments, the first portion of ammonium and sulfite is equal to or less than the second portion of ammonium and sulfite). In exemplary embodiments, the first portion of ammonium and sulfite is between about 1 and about 50% of the total amount of ammonium and sulfite used in the method, and more particularly, about 30%. In exemplary embodiments, the second reaction mixture is heated in (iv) to a temperature of between about 100° C. to about 110° C. In exemplary embodiments, the reaction is continued in step (v) by either maintaining the reaction at between about 100° C. to about 110° C. or by heating the reaction mixture to a temperature greater than about 110° C., or more particularly, about 130° C. Optionally, the solution is pre-heated prior to step (ii). In exemplary embodiments, the pH of the reaction mixture is maintained between about 1.2 and about 3.0, more particularly, about 1.5 and about 1.8.

In an exemplary embodiment, the method of the present invention comprises (i) providing a solution (i.e., a first reaction mixture) comprising fructose and an acid in a reaction vessel; (ii) closing the reaction vessel; (iii) adding a first portion of ammonium and sulfite to the first reaction mixture to provide a second reaction mixture; (iv) heating the second reaction mixture to a temperature of at least about 80° C.; (v) adding a second portion of ammonium and sulfite to the second reaction mixture; and (vi) continuing the reaction, to provide a low-4-MeI class IV caramel. In exemplary embodiments, the first portion of ammonium and sulfite is equal to or less than the amount of ammonium and sulfite added in step (iii). In exemplary embodiments, the first portion of ammonium and sulfite is between about 1 and about 50% of the total amount of ammonium and sulfite used in the method, and more particularly, about 30%. In exemplary embodiments, the second reaction mixture is heated to a temperature of, between about 100° C. and about 110° C. In exemplary embodiments, the reaction is continued in step (iv) by maintaining the reaction at about at the same temperature as step (iv) or by heating the solution to a temperature greater than step (iv), or more particularly, between about 115° and about 125° C. In exemplary embodiments, the pH of the reaction mixture is maintained between about 1.2 and about 3.0, more particularly, about 1.5 and about 1.8.

The dextrose equivalence (DE) of the carbohydrate may vary. For example, the carbohydrate is glucose syrup with a dextrose equivalence ranging from about 20 DE to about 95 DE. In a particular embodiment, the carbohydrate is glucose syrup with a DE of between about 70 and about 95 and more particularly, about 70, about 80 or about 90.

In some embodiments, once the caramelization reaction has initiated, the temperature of the reaction is held constant while the reaction process over at a period of a least 1 hour, at least 80 minutes, at least 2 hours, at least 3 hours, or at least 4 hours, or at least 5 hours, or at least 6 hours. In certain embodiments, the temperature is held constant at least about 100°, at least about 110° C., at least about 115° C., at least about 120° C., at least about 130° C., at least about 140° C., or greater than 140° C. In specific embodiments, the portion of ammonium and sulfite added after the reaction has initiated (which may be either the entire amount, or a portion of the entire amount) is added over a period for between about ⅓ and ⅛ of the total time of reaction, or between about ¼ and ⅙ or between about 15% to about 30% of the total time. In certain embodiments, the rate of addition of the ammonium and sulfite is constant for the time period in which it is added.

The relative amount of ammonium and sulfite to carbohydrate may vary. In a particular embodiment, the ammonium and sulfite are provided in the form of ammonium bisulfite and the ratio of ammonium bisulfite to carbohydrate is between about 1:8 and about 1:4. In an exemplary embodiment, the ratio of ammonium bisulfite to carbohydrate is about 1:4, about 1:5, about 1:6, about 1:7 or about 1:8.

The rate of addition of ammonium and sulfite may vary. In one embodiment, the carbohydrate is glucose or glucose syrup and the rate of addition is between about 5 mL/min and about 30 mL/min. In a particular embodiment, the rate of addition is between about 10 mL/min and about 25 mL/min. In an exemplary embodiment, the rate of addition is about 10 mL/min, about 12 mL/min, about 14 mL/min, about 16 mL/min, about 18 mL/min, about 20 mL/min, about 22 mL/min, about 24 mL/min, about 26 mL/min, about 28 mL/min or about 30 mL/min.

In a particular embodiment, the carbohydrate is sucrose or another fructose-containing carbohydrate (e.g., sucrose) and the rate of addition is between about 50 and about 130 minutes, more particularly, about 70 and about 120 minutes, and even more particularly, about 60 and about 110 minutes.

The order of addition of the carbohydrate, acid, ammonium and sulfite components may vary. In one embodiment, the order of addition is: carbohydrate, ammonium/sulfite (in either order or together) and acid. In another embodiment, the order of addition is: ammonium/sulfite (in either order or together), carbohydrate and acid. In yet another embodiment, the order of addition is ammonium/sulfite (in either order or together), acid and carbohydrate. In a still further embodiment, the order of addition is: acid, carbohydrate and ammonium/sulfite (in either order or together). In yet another embodiment, the order of addition is acid, ammonium/sulfite (in either order or together) and carbohydrate.

In a particular embodiment, all of the acid is added before the reaction (i.e., heating begins). In another particular embodiment, a portion of the acid is added after the reaction begins.

The reaction temperature may vary. In one embodiment, the reaction temperature is between about 60° C. and about 200° C., more particularly, between about 60° and about 80°

C., between about 80° and about 100° C., between about 100° C. and about 130° C., between about 130° C. and about 150° C., between about 150° C. and about 170° C., or between 170° C. and 200° C. In a particular embodiment, the reaction temperature is between about 100° C. and about 120° C., about 120° C. and about 130° C., about 115° C. and about 125° C. or about 110 and about 130° C.

In a particular embodiment, the carbohydrate is glucose or glucose syrup and the reaction temperature is between about 115° C. and about 130° C.

In another particular embodiment, the carbohydrate is a fructose-containing carbohydrate (e.g., sucrose) and the reaction temperature is between about 110° C. and 125° C.

The method may further comprise one or more additional steps. In one embodiment, the method further comprises adjusting the pH of the caramel to between about 2.4 and about 3.25.

The reaction mixture may be vented at various points to maintain a particular reaction pressure, such as during addition of the ammonium/sulfite source salt and/or after the addition of the ammonium sulfite source. In a particular embodiment, venting maintains the reaction pressure is maintained at about 55 PSI.

The reaction mixture(s) may also be cooled at various points. In a particular embodiment, the method further comprising cooling the reaction mixture to about 70° C. In another embodiment, the method further comprises cooling and then reheating the reaction mixture. In an exemplary embodiment, the reaction mixture is cooled to 60° C. after KOH addition and reheated to 130° C. for 30 minutes.

The reaction mixture may also be filtered at various points.

Water may be added to the reaction mixture at various points.

In one embodiment, the method does not involve addition of base once the reaction has begun. In another embodiment, the method does not involve addition of base after the reaction vessel has been closed.

Total reaction times may vary. In one embodiment, total reaction time ranges from about 3.0 to about 8.0 hours, from about 3.5 to about 7.5 hours, about 4 to about 6 hours or about 5 hours, depending on reaction temperature setting.

Thus, in one embodiment, the present invention is a method of forming a low-4-MeI class IV caramel, the method comprises (i) adding a carbohydrate and an acid to a reaction vessel to provide a first reaction mixture (ii) initiating the caramelization reaction; (iii) after initiation, adding a portion of ammonium and sulfite to solution; and (iv) continuing the caramelization reaction, thereby producing the low-4-MeI class IV caramel, wherein the total reaction time is between about 3.0 and about 8.0 hours, and more particularly, about 5 to about 7.5 hours, about 4 to about 6 hours or about 5 hours. In exemplary embodiments, the caramelization reaction in (ii) is initiated by heating the solution to a temperature of at least about 80° C. In exemplary embodiments, the caramelization reaction in (ii) is initiated by adding a first portion of ammonium and sulfite to the solution and heating the solution to a temperature of at least about 80° C., while the solution is contained within a reaction vessel that is closed prior to the addition of the first portion of ammonium and sulfite.

The stability of the caramels formed by the method of the present invention is advantageous relative to methods known in the art. In one embodiment, the caramel is stable for greater than about 6 months, about 8 months, about 10 months, 12 months, about 14 months, about 16 months, about 18 months, about 20 months, about 22 months, about or about 24 months.

In a particular embodiment, the caramel is a glucose or glucose syrup-derived caramel having a stability of at least about 12 months, or at least about 18 months, or longer than about 18 months.

In a particular embodiment, the caramel is a derived from a fructose-containing caramel and the caramel has a stability of at least about 6 months and preferably, at least about 10 months.

The stability of the caramels produced by the method of the present invention is reflected in a reduction in gelling properties relative to prior art methods for producing low-4-MeI caramels.

In exemplary embodiments, the caramels produced by the method of the present invention are about 2, about 5, about 10, about 15, about 20, about 25, about 30, about 35, about 40, about 45 or about 50% or more stable than low 4-MeI caramels made by the method of Parker et al.

The 4-MeI content of the caramels formed by the present invention is low. In one embodiment, the 4-MeI content of the caramel is about 100 ppm, about 75 ppm, about 50 ppm, about 25 ppm, about 20 ppm, about 15 ppm, about 10 ppm, about 5 ppm, about 3 ppm, about 2 ppm or about 1 ppm. In exemplary embodiments, the 4-MeI content of the caramel is about 0.9 ppm, about 0.8 ppm, about 0.7 ppm, about 0.6 ppm, about 0.5 ppm, about 0.4 ppm, about 0.3 ppm, about 0.2 ppm, or about 0.1 ppm, or zero.

In exemplary embodiments, the 4-MeI content of the caramels formed by the method of the present invention is about 15 ppm or less, about 12 ppm or less, about 10 ppm or less, about 8 ppm or less, about 6 pp or less, about 4 ppm or less, about 2 ppm or less, or about 1 ppm or less. In exemplary embodiment, the 4-MeI content of the caramel is about 1 ppm or less, or about 0.9 ppm or less, or about 0.8 ppm or less, or about 0.7 ppm or less, or about 0.6 ppm or less, or about 0.5 ppm or less, or about 0.4 ppm or less, or about 0.3 ppm or less, or about 0.2 ppm or less, or about 0.1 ppm or less, or even zero, i.e., undetectable by conventional methods.

The color intensity or strength of the caramel formed by the present invention may vary. The color strength of caramel color is defined as its Tinctorial Power, $K_{O.560}$. This is the absorbance of a 0.1% weight/volume solution measured through a 1 cm light path at a wavelength of 560 nanometers (nm) using a high quality spectrophotometer. The higher the value of the absorbance, the Tinctorial Power, $K_{O.560}$, the darker the caramel color. In one embodiment, the color intensity is between about 0.216 and about 0.240.

The caramel may be any suitable strength. In one embodiment, the caramel is single strength. In another embodiment, the caramel is double strength.

In an exemplary embodiment, the present invention is a method of forming a low-4-MeI glucose caramel IV, the method comprising (i) adding a carbohydrate and an acid to a reaction vessel to provide a first reaction mixture, wherein the carbohydrate is selected from glucose and glucose syrup; (ii) initiating a caramelization reaction in the solution; (iii) after initiation, adding a portion of ammonium and sulfite to solution; and (iv) continuing the caramelization reaction, thereby producing a low-4-MeI class IV glucose caramel comprising about 15 ppm or less of 4-MeI and having a stability of at least 12 months and preferably about 18 months. In exemplary embodiments, the ammonium and sulfite is added at a rate between about 20 and about 25 mL/min, the ratio of ammonium bisulfate to carbohydrate is between about 1:8 and about 1:4 and the pH is maintained between about 1.2 and about 3.0, preferably between about 1.5 and about 1.8. In exemplary embodiments, the caramelization reaction in (ii) is initiated by heating the solution to a temperature of at least about 80° C., more particularly about 100° C., or between about 100° C. and 110° C. In exemplary embodiments, the caramelization reaction in (ii) is initiated by adding a first portion of ammonium and sulfite to the solution and heating the solution to a temperature of at least about 80° C., more particularly about 100° C., or between about 100° C. and 110° C., while the solution is contained within a reaction vessel that is closed prior to the addition of the first portion of ammonium and sulfite. In exemplary embodiments, the caramelization reaction in (v) is continued by maintaining the heat at least about 80° C., more particularly about 100° C., or between about 100° C. and 110° C. or, optionally, increasing the heat, e.g., increasing the heat to a temperature of at least about 110° C., or between about 110° C. to about 130° C., or about 130° C.

Optionally, the first or second reaction mixture is preheated In a particular embodiment, the caramel has a color intensity of between about 0.216 and about 0.240.

In another exemplary embodiment, the present invention is a method of forming a low-4-MeI class IV caramel, the method comprises (i) adding a carbohydrate and an acid to a reaction vessel to provide a first reaction mixture, wherein the carbohydrate is a fructose-containing carbohydrate (e.g., sucrose); (ii) initiating a caramelization reaction in the solution; (iii) after initiation, adding a portion of ammonium and sulfite to solution; and (iv) continuing the caramelization reaction, thereby producing a low-4-MeI class caramel comprising about 15 ppm or less of 4-MeI and a stability of at least about 6 months and more preferably, at least about 10 months. In exemplary embodiments, the ammonium bisulfite is added at a rate of between about 5 and about 15 mL/min, or more particularly, about 5 and about 10 mL/min, the ratio of ammonium bisulfite to carbohydrate is between about 1:8 and about 1:4 and the pH of the reaction is maintained between about 1.2 and about 2.0, preferably between about 1.5 and about 1.8. Optionally, the first reaction mixture is pre-heated. In a particular embodiment, the first mixture is pre-heated. In exemplary embodiments, the caramelization reaction in (ii) is initiated by heating the solution to a temperature of at least about 80° C., more particularly about 100° C., or between about 100° C. and 110° C. In exemplary embodiments, the caramelization reaction in (ii) is initiated by adding a first portion of ammonium and sulfite to the solution and heating the solution to a temperature of at least about 80° C., more particularly about 100° C., or between about 100° C. and 110° C., while the solution is contained within a reaction vessel that is closed prior to the addition of the first portion of ammonium and sulfite. In exemplary embodiments, the caramelization reaction in (v) is continued by maintaining the heat at least about 80° C., more particularly about 100° C., or between about 100° C. and 110° C. or, optionally, increasing the heat, e.g., increasing the heat to a temperature of at least about 110° C., or about 115° C. to about 125° C., 110° C. or about 125° C.

In exemplary embodiments, the amount of 4-MeI is reduced by about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% over prior art methods of producing class IV caramels, or low-4-MeI class 4 caramels.

II. Filtration Method

In one aspect, the present invention provides a method of reducing the amount of low molecular weight species present in a caramel, such as a class III or class IV caramel. Advantageously, the method the present invention conserves water relative to purification methods known in the art. The caramel purified by this method may be used directly or may be subject to one or more additional steps to further reduce the amount of low molecular weight species.

The method may be used to reduce the amount of low molecular weight species in caramel color that include, but are not limited to, 4-MeI, 2-methylimidazole (2-MeI), 5-hydroxy methyl furfural (5-HMF), 5-hydroxy 2-methyl pyridine, 2-hydroxy pyridine, and 2-hydroxy 6-methylpyridine carboxylic acid.

The caramel can be prepared by conventional methods (i.e., without benefit of any effort to reduce the low molecular weight species, such as 4-MeI) or can be a caramel synthesized to reduce the formation of low molecular weight species, such as 4-MeI, including but not limited the method described in Section I, above. In exemplary embodiments, the method may be a batch filtration method.

In one embodiment the filtration method is used to reduce the amount of low molecular weight species in a class III or class IV caramel prepared by conventional means. In a particular embodiment, the filtration method is used to reduce the amount of low molecular weight species in a caramel in which about 60% of the solids constitute low molecular weight species. In certain embodiments, the filtration method results in a caramel in which less than about 30% or less than about 20% or less than about 10% or less than about 5% or less than about 1% of solids constitute low molecular weight species.

In an exemplary embodiment, the present invention is a method for reducing the amount of low molecular weight species in a class III or class IV caramel, comprising: (i) providing a solution comprising a class III or class IV caramel; (ii) subjecting the solution to diafiltration to provide a retained fraction and a permeated fraction, said retained fraction comprising high molecular weight color bodies and water; (iii) subjecting the permeate fraction to reverse osmosis to provide a recycle water stream and a permeate concentrate stream; (iv) optionally, concentrating the permeate concentrate stream to provide a permeate super concentrate stream comprising about 70% solids; (v) adding the retained fraction and recycle water stream to the caramelized solution; and (vi) repeating steps (ii)-(v) one or more times to provide a concentrated, purified class III or class IV caramel comprising a reduced amount of low molecular weight species. In an exemplary embodiment, the method may be carried out until the desired concentration of 4-MeI is achieved. In exemplary embodiments, the method is carried out over a period of time between about 3 and about 10 hours, or more particularly, about 6 hours. In an exemplary embodiment, the method is carried out over a period of about 3, about 4, about 5, about 6, about 7, about 8, about 9, about 10 or about 10 hours or more. In one embodiment, the method is carried out over between about 3 and about 10 hours, or more particularly, about 6 hours to achieve a 4-MeI concentration of less than about 15 ppm, or about 10 ppm or less, or about 5 ppm or less, or about 1 ppm or less.

In a particular embodiment, the purified class III or IV caramel has a reduced amount of species having a molecular weight of less than about 800, more particularly less than about 700, and even more particularly less than about 600. In exemplary embodiments, the class III or class IV caramel has a reduced amount of one or more low molecular weight species selected from the group consisting of 4-MEI, 2-methylimidazole (2-MEI), 5-hydroxy methyl furfural (5-HMF), 5-hydroxy 2-methyl pyridine, 2-hydroxy pyridine, and 2-hydroxy 6-methylpyridine carboxylic acid.

In a particular embodiment, the present invention is a method for reducing the amount of 4-MeI in class III or class IV caramel, comprising: (i) providing a solution comprising class III or class IV caramel prepared by conventional means; (ii) subjecting the solution to diafiltration to provide a retained fraction and a permeated fraction, said retained fraction comprising high molecular weight color bodies and water; (iii) subjecting the permeate fraction to reverse osmosis to provide a recycle water stream and a permeate concentrate stream; (iv) optionally, concentrating the permeate concentrate stream to provide a permeate super concentrate stream comprising about 70% solids; (v) adding the retained fraction and recycle water stream to the caramelized solution; and (vi) repeating steps (ii)-(v) one or more times to provide a concentrated, purified low-4-MeI class III or class IV caramel. In an exemplary embodiment, the method may be carried out until the desired concentration of 4-MeI is achieved. In exemplary embodiments, the method is carried out over a period of time between about 3 and about 10 hours, or more particularly, about 6 hours. In an exemplary embodiment, the method is carried out over a period of about 3, about 4, about 5, about 6, about 7, about 8, about 9, about 10 or about 10 hours or more. In one embodiment, the method is carried out over about between about 3 and about 10 hours, or more particularly, about 6 hours to achieve a 4-MeI concentration of less than about 15 ppm, or about 10 ppm or less, or about 5 ppm or less, or about 1 ppm or less.

In one embodiment, the class III or IV caramel may be single strength or double strength. The caramelized solution may be prepared by mixing class III or IV caramel with process water or treated process water. The carbohydrate used to prepare the class III or IV caramel may be any suitable carbohydrate, including those identified in Section I, above. In a particular embodiment, the carbohydrate is glucose, glucose syrup or fructose-containing carbohydrate, such as sucrose.

Advantageously, the caramel that results from the filtration method has from about 100 to about 100,000 times less 4-MeI than the caramel, prior to filtration or more particularly about 100 to about 10,000 less 4-MeI or even more particularly about 100 to about 1,000 less 4-MeI. In exemplary embodiment, the concentrated, purified low-4-MeI caramel contains about 1 ppm or less of 4-MeI.

The method may also be used to supplement another process, e.g., to further reduced the amount of 4-MeI present in a low 4-MeI caramel, such as a low-4 MeI caramel synthesized by the method in Section II, above. When the filtration method is combined with the synthesis method described, the concentrated, purified low-4-MeI class caramel advantageous has about 100 to about 1000 times less 4-MeI than the synthesis product. In exemplary embodiments, the concentrated, purified low-4-MeI caramel that results from combining the two methods contains about or less than about 1 ppm 4-MeI, or more particularly, about or less than about 0.1 ppm.

In an exemplary embodiment, the present invention is a method for reducing the 4-MeI content of a low 4-MeI class IV caramel, comprising: (i) providing a caramelized solution comprising a low-4-MeI class IV caramel; (ii) subjecting the caramelized solution to diafiltration to provide a retained fraction and a permeated fraction, said retained fraction comprising high molecular weight color bodies and water; (iii) subjecting the permeate fraction to reverse osmosis to provide a recycle water stream and a permeate concentrate stream; (iv) optionally, concentrating the permeate concentrate stream to provide a permeate super concentrate stream comprising about 70% solids; (v) adding the retained fraction and recycle water stream to the caramelized solution; and (vi) repeating steps (ii)-(v) one or more times to provide a concentrated, purified low-4-MeI class IV caramel having a reduced amount of 4-MeI relative to the low-4-MeI class IV caramel subject to filtration. In a particular embodiment, the concentrated, purified low-4-MeI has about 100 to about 1000 times less 4-MeI than a class IV caramel prepared by conventional means.

The reactions components used to prepare the class TV caramel (e.g., the carbohydrate, acid, ammonium and sulfite) may be any suitable reaction components, including those disclosed in Section I, above. In a particular embodiment, the carbohydrate is selected from glucose, glucose syrup or a fructose-containing carbohydrate, such as sucrose).

In a particular embodiment, the caramelized solution is prepared by mixing class IV caramel with treated process water in a about 1 to 1 dilution. The caramelized solution is generally prepared in a feed tank, to which class IV caramel and process water are added.

In one embodiment, the pH of the caramelized solution is greater than about 7.5 and more particularly, greater than about 7.8. It may necessary to adjust the pH of the caramelized solution, for example by addition of NaOH/KOH and/or phosphoric acid.

The method involves diafiltration to separate high molecular weight species from low molecular weight species, such as 4-MeI. Any suitable method of diafiltration may be used, including ultra-filtration and nano-filtration.

In one embodiment, the method of the present invention utilizes nano-filtration. In an exemplary embodiment, molecular cut off is about 600 to 800 Dalton. In another exemplary embodiment, the molecular cut off is about 700 Dalton.

Diafiltration may be conducted in any suitable mode, such constant flux mode, constant pressure mode or combinations thereof. In a particular embodiment, diafiltration is conducted in constant pressure mode until most of the low molecular weight species have been removed (indicated by the reduction of the brix meter reading of the permeate stream to ~1 brix), and thereafter, in constant flux mode.

The temperature at which the method is conducted may vary. In one embodiment, the process is carried out at a temperature between about 60° F. and about 95° F. In a particular embodiment, the process is carried out at a temperature of about 80° F.

The pressure at which the method is conducted may vary. In one embodiment, the process begins with a constant pressure of about 50 to 55 psi.

Diafiltration produces a retained fraction and a permeated fraction, where the retained fraction comprising high molecular weight color bodies and water and the permeated fraction comprising low molecular weight species, such as 4-MeI.

The retained fraction (i.e., the retentate) is recirculated back to the feed tank and the permeated fraction is directed to reverse osmosis (RO). Specifically, the permeated fraction is to the balance tank of the RO unit. The permeate of the reverse osmosis (RO) unit is directed to the filtration unit. Flux is about 15% less than the filtration unit, so fresh water may be used.

In one embodiment, the permeate flux (is between about 18 liters per hour per m² and about 36 liters per hour per m². In a particular embodiment, the permeate flux is about 18 liters per hour per m², about 0 21 liters per hour per m², about 24 liters per hour per m², about 27 liters per hour per m², about 30 liters per hour per m², about 33 liters per hour per m² or about 36 liters per hour per m²

Reverse osmosis produces a recycled water stream and a permeate concentrate stream. The recycle water stream is redirected back to the feed tank. Advantageously, this limits overall water use required for the purifying the class IV caramel.

In one embodiment, the method of the present invention requires about 50, about 60, about 70, about 80, or about 85% less water than purification methods known in the art.

The permeate concentrate stream may be concentrated by any suitable method to provide a super concentrate, i.e., a permeate concentrate having greater than about 70% solids. For example, the permeate concentrate stream may be concentrated by feeding the permeate concentrate to an evaporator. Optionally, the permeate super concentrate may be dried to provide a dried permeate super concentrate. The dried permeate super concentrate may be considered a waste product, or may be used to synthesize caramel, or may be used as a feed ingredient for fermentation to produce value added materials such as ethanol The process time may vary. In one embodiment, the process time is from about 2 to about 10 hours. In a particular embodiment, diafiltration is carried out for about 7 hours. According to this embodiment, the first hour of diafiltration is carried out in constant pressure mode, and the remaining six hours of diafilitration are carried out in constant flux mode.

Generally, the diafiltration step is continued until the caramel is purified to a desired degree. In one embodiment, diafiltration is continued until the desired level of 4-MeI is achieved. In a particular embodiment, the desired level of 4-MeI is less than about 10 ppm, less than about 5 ppm, less than about 1 ppm or less than about 0.1 ppm.

In a particular embodiment, the class IV caramel is double strength class IV caramel and the desired 4-MeI content of the purified class IV caramel is less than about 1 ppm.

In another particular embodiment, the class IV caramel is low-4-MeI double strength class IV caramel and the desired 4-MeI content of the purified class IV caramel is less than about 0.1 ppm.

After diafiltration is stopped, the caramel (i.e., the processed retentate) may be concentrated to a desired color strength or intensity and the pH may be adjusted.

In one embodiment, the processed retentate is concentrated to a Tinctorial Power (TP) of about 0.35 and then adjusted pH to about 3 by the addition of 75% food grade phosphoric acid.

The concentrated purified class IV caramel may be collected and stored. Optionally, the concentrated purified class IV caramel may be spray dried to yield dry powder for storage In another embodiment, the present invention is a method of making a concentrated, purified low-4-MeI class IV caramel, comprising (i) adding a carbohydrate and an acid to a reaction vessel to provide a first reaction mixture; (ii) adding a first portion of ammonium and sulfite to the first reaction mixture to provide a second reaction mixture; (iii) closing the reaction vessel; (iv) adding a second portion of ammonium and sulfite to the second reaction mixture to provide a third reaction mixture; (v) heating the third reaction mixture to between about 110° C. and about 130° C., thereby forming the low-4-MeI class IV caramel; (vi) subjecting the low-4-MeI class IV caramel to diafiltration to provide a retained fraction and a permeated fraction, said retained fraction comprising high molecular weight color bodies and water; (iii) subjecting the permeate fraction to reverse osmosis to provide a recycle water stream and a permeate concentrate stream; (iv) optionally, concentrating the permeate concentrate stream to provide a permeate super concentrate stream comprising about 70% solids; (v) adding the retained fraction and recycle water stream to the caramelized solution; and (vi) repeating steps (ii)-(v) one or more times to provide a concentrated, purified low-4-MeI caramel.

III. Methods of Preparing Food or Beverages

The present invention also extends to methods of using the caramel obtained using the methods of the present invention to manufacture a food or beverage product, such as a soda (e.g., a cola), as well as the food or beverage product comprising the caramel IV color.

In a particular embodiment, the present invention is a method of making a food or beverage, comprising adding the low-4-MeI caramel made by the methods disclosed herein to a food or beverage matrix. The caramel may be a class III or class IV caramel produced by the methods of the present invention.

In exemplary embodiments, the present invention is a method of making a beverage, comprising adding a low-4-MeI class IV caramel (e.g., a glucose or sucrose caramel) to a beverage matrix, wherein the low-4-MeI class IV caramel is made by a method selected from the synthesis method disclosed herein, the filtration method disclosed herein, or a combination thereof.

In exemplary embodiments, the present invention is a method of making a beverage, comprising adding a low-4-MeI class IV caramel (e.g., a glucose or sucrose caramel) to a beverage matrix, wherein the low-4-MeI class IV caramel is made by a method selected from the synthesis method disclosed herein, the filtration method disclosed herein, or a combination thereof and wherein the caramel has less than about 15 ppm of MEI.

In exemplary embodiments, the present invention is a method of making a beverage, comprising adding a low-4-MeI class IV caramel to a beverage matrix, wherein the low-4-MeI class IV caramel is made by a method selected from the synthesis method disclosed herein, the filtration method disclosed herein, or a combination thereof and wherein the caramel has less than about 15 ppm of MEI and is stable for at least about 6 months, or at least about 10 months, or at least about 12 months, or at least about 18 months.

In certain embodiments, the present invention is a method of making a beverage, comprising adding a low-4-MeI class III caramel (e.g., a glucose or sucrose caramel) to a beverage matrix, wherein the low-4-MeI class III caramel is made by the filtration method disclosed herein, or a combination thereof and wherein the caramel has less than about 15 ppm of MEI. In exemplary embodiments, the is stable for at least about 6 months, or at least about 10 months, or at least about 12 months, or at least about 18 months.

The beverage may be, for example, a soft drink or soda and more particularly, a cola. In certain embodiments, the beverage is a beer, such as a dark beer.

IV. Compositions

The present invention also includes the caramel obtained using the methods described herein, as well as food or beverage comprising the caramel. The caramel may be a class III or class IV caramel.

In one embodiment, the present invention is a caramel obtained using the methods described herein, comprising a reduced amount of low molecular weight species relative to a caramel prepared by conventional means. In a particular embodiment, the total amount of low molecular weight species has been reduced by, about 20, about 30, about 40, about 50, about 60, about 70, about 80, about 90, or about 99% or more.

In an exemplary embodiment, the present invention is a caramel obtained using the methods described herein, comprising a reduced amount of compounds having a molecular weight less than about 800 Daltons, less than about 700 Daltons or less than about 600 Daltons.

In a particular embodiment, the total amount of species with a molecular weight less than 800 Daltons has been reduced by, about 20, about 30, about 40, about 50, about 60, about 70, about 80, about 90, or about 99% or more.

In another particular embodiment, the total amount of species with a molecular weight less than 700 Daltons has been reduced by, about 20, about 30, about 40, about 50, about 60, about 70, about 80, about 90, or about 99% or more.

In yet another particular embodiment, the total amount of species with a molecular weight less than 700 Daltons has been reduced by about 20, about 30, about 40, about 50, about 60, about 70, about 80, about 90, or about 99% or more.

In another embodiment, the caramel has a reduced amount of one or more local molecular weight species selected from the group consisting of 4-MeI, 2-methylimidazole (2-MEI), 5-hydroxy methyl furfural (5-HMF), 5-hydroxy 2-methyl pyridine, 2-hydroxy pyridine, and 2-hydroxy 6-methylpyridine carboxylic acid. In a particular embodiment, the total amount of the molecular weight species has been reduced by about 20, about 30, about 40, about 50, about 60, about 70, about 80, about 90, or about 99% or more.

In one embodiment, the caramel is low-4-MeI class IV caramel obtained using the synthesis method disclosed herein.

In another embodiment, the caramel is a concentrated, purified low-4-MeI class III or class IV caramel obtained using the filtration method disclosed herein.

In a particular embodiment, the caramel is a concentrated, purified low-4-MeI class IV caramel obtaining using the synthesis method and filtration method disclosed herein, in combination.

In a particular embodiment, the caramel is a low-4-MeI caramel obtained using the methods disclosed herein, comprising about 15 ppm or less of 4-MeI, or more particularly, about 10 ppm or less, about 5 ppm or less, about 1 ppm or less, or about 0.1 ppm or less, 4-MeI. In exemplary embodiments, the low-4-MeI caramel is a zero-4-MeI caramel.

In an exemplary embodiment, the present invention is a class IV glucose caramel obtained using the methods disclosed herein, comprising about 15 ppm or less of 4-MeI and stable for at least about 12 months and preferably, about 18 months. In exemplary embodiments, the class IV glucose caramel comprises less than about 10 ppm, or less than about 5 ppm, or less than about 1 ppm 4-MeI. In exemplary embodiments, the class IV glucose caramel comprises less than about 0.9 ppm, less than about 0.8 ppm, less than about 0.7 ppm, less than about 0.6 ppm, less than about 0.5 ppm, less than about 0.4 ppm, less than about 0.3 ppm, less than about 0.2 ppm, or less than about 0.1 ppm 4-MeI.

In another exemplary embodiment, the present invention is a class IV caramel made from a fructose-containing carbohydrate (e.g., sucrose) and obtained using the methods disclosed herein, comprising about 15 ppm or less of 4-MeI and stable for at least about 6 months and preferably, about 10 months. In exemplary embodiments, the class IV caramel made from a fructose-containing carbohydrate according to the methods disclosed herein caramel comprises less than about 10 ppm, or less than about 5 ppm, or less than about 1 ppm 4-MeI and stable for at least about 6 months, or at least about 10 months. In exemplary embodiments, the class IV caramel comprises less than about 0.9 ppm, less than about 0.8 ppm, less than about 0.7 ppm, less than about 0.6 ppm, less than about 0.5 ppm, less than about 0.4 ppm, less than about 0.3 ppm, less than about 0.2 ppm, or less than about 0.1 ppm 4-MeI and stable for at least about 6 months, or at least about 10 months.

In yet another embodiment, the present invention is a beverage comprising a low-4-MeI class IV or class III caramel obtained by the methods disclosed herein.

In a particular embodiment, the beverage is a soft drink or soda, such as a cola. In another particular embodiment, the beverage is a dark beer.

EXAMPLES

Example 1: Stability Test

The native pH of caramel (pH=2.4-3.4) is adjusted to 6.0 by addition of KOH. 12 mL of the pH adjusted caramel is poured into 50 mL glass tube, and the total weight of tube plus caramel is recorded. The remainder of the pH adjusted caramel is used to measure the viscosity at 25° C. Tube with caramel is placed into aluminum heating blog, pre-equilibrated to 100° C. on hot plate and heated for one hour (temp range 96° C.-103° C.), after which the tube is removed and cooled with flush of air for 5 minutes. Water is added to the previously heated caramel to account for evaporation during the heating and the content in tube is mix vigorously. Viscosity is measured at 25° C. and compared to the viscosity of pH adjusted and unheated caramel, using Bohlin's Gemini 2 viscometer with "Cup & Bob" (size –14 mm) setting. Differences between viscosities of a before, and after heating caramels are recorded and stability is predicted based on data accumulated experimentally. The model for stability prediction is derived from long term (4 months) monitoring studies of viscosity changes for stable and unstable (gelling or non-gelling) caramels. The prediction of stability is relative, i.e., stability of the caramel in question as compared to low-4-MeI caramels known to be stable for long periods of time.

Example 2: Production of Low-4-MeI Caramel from Glucose Syrup

All ingredients used for the synthesis were food grade. The experiment was carried out in a 2 gallon, high pressure reactor (Parr Instrument Company, 211 Fifty Third Street, Moline, Ill. 61265-1770), equipped with sample withdrawing and liquid addition dip tube ports, and gas venting ports. The pH and the color (Tinctorial Power=$Abs_{560}$ of 0.1% caramel solution) were periodically monitored on samples withdrawn during the reaction (Oacton 110 pH meter, and DU® 700 Series UV/Vis Spectrophotometers, Beckman Coulter, respectively).

Glucose syrup (3.9 kg, 43% DE, 81 Brix) was charged with phosphoric acid (0.15 kg, 85%) and reaction mixture was heated.

When temperature reached 115° C., the addition of ammonium bisulfite (2.0 kg, 1.7 L, 35.5%) commenced at the rate of 22 mL/min and continued for 80 minutes, at the same rate, until all amount was added.

Temperature of 130° C., was reached 10 minutes after addition of ABS started and was kept constant during the reaction. The reaction pressure reached 55 PSI and was kept constant by venting off the excess gasses.

After 4.5. hours the reaction product reached the desired color intensity ($Abs_{610}$=0.265) at which point the gas vents were open and reaction mixture was cooled to 23° C.

Potassium hydroxide (0.245 kg, 50%) and water (0.2 kg) was added to adjust the pH (2.84) and dilute the caramel to final color intensity ($Abs_{610}$=0.219) and specific density @ 20° C. of 1.261 gm/ml.

4-MeI was measured using LC/MS/MS. The measured concentration of 4-MeI was 4.1 mg/kg.

Stability was measured as in Example 1. The caramel proved to be very stable.

Example 3: Production of Low-4-MeI Caramel from Sucrose

All ingredients used for the synthesis were food grade. The experiment was carried out using the reactor described in Example 1 and the pH and the color were periodically monitored on samples withdrawn during the reaction, as describe in Example 1.

Sucrose (2.0 kg,) was added to 0.5 kg of water and charged with phosphoric acid (0.05 kg, 85%) and the reaction mixture was heated. When temperature reached 100° C., the addition of ammonium bisulfite (1.2 kg, 0.85 L, 37.5%) commenced at the rate of 10 mL/min and continued for 85 minutes, at the same rate, until all amount was added.

Temperature of 125° C., was reached 15 minutes after addition of ABS started and was kept constant during the reaction. The reaction pressure reached 45 PSI and was kept constant by venting off the excess gasses.

After 6.5. hours the reaction product reached the desired color intensity ($Abs_{610}$=0.245) at which point the gas vents were open and reaction mixture was cooled to 23° C.

Potassium Hydroxide (0.200 kg, 50%) was added to adjust the pH (2.96) which gave final caramel color intensity ($Abs_{610}$=0.216) and specific density @ 20° C. of 1.267 gm/ml.

Measured as described in Example 1, the concentration of 4-MeI was 9.56 mg/kg with measured viscosity of 35.78 cP @ 30° C.

Measured as described in Example 1, the caramel proved to be 67% as stable as the most stable caramel color made from glucose syrup which is in agreement with stability ratios between glucose and sucrose non-low-4-MeI (>100 ppm) caramels.

Example 4: Production of Low-4-MeI Caramel from Sucrose

Sucrose (2.0 kg,) was added to 0.5 kg of water and charged with Ammonium Bisulfite (0.195 kg, 68%) and Phosphoric Acid (0.09 kg, 85%) and reaction mixture was heated.

When temperature reached 100° C., the addition of remaining Ammonium Bisulfite (0.46 kg, 68%) commenced at the rate of 7.5 ml/min for 85 minutes. Temperature of 125° C., was reached 15 minutes after addition of ABS started and was kept constant (125 Deg C.) during the reaction. The reaction pressure reached 45 PSI and was kept constant by venting off the excess gasses.

After 6.0. hours the reaction product reached the desired color intensity ($Abs_{610}$=0.245) at which point the gas vents were open and reaction mixture was cooled to 23° C. Potassium Hydroxide (0.200 kg, 50%) was added to adjust the pH (2.96) which gave final caramel color intensity ($Abs_{610}$=0.216) and specific density @ 20° C. of 1.267 gm/ml.

The measured concentration of 4-MeI was 14.3 mg/kg with measured viscosity of 30.23 cP @ 30° C., and caramel proved to be 67% as stable as the most stable caramel color made from glucose syrup, which is in agreement with stability ratios between glucose and sucrose non-low-4-MeI caramels.

Example 5: Production of Low-4-MeI Caramel from Sucrose

The sucrose (2.0 kg,) was added to 0.5 kg of water and charged with Phosphoric Acid (0.09 kg, 85%). A mixture of Ammonium Bisulfite (0.195 kg, 68%), and Sodium metabisulfite (0.12 kg) was added, reaction vessel was closed and reaction mixture was heated.

When temperature reached 100° C., the addition of remaining Ammonium Bisulfite (0.46 kg, 68%) and Ammonium metabisulfite (0.28 kg) mixture started at the rate of 7.5 ml/min for 85 minutes. Temperature of 125° C., was reached 15 minutes after addition of ABS started and was kept constant (125 Deg C.) during the reaction. The reaction pressure reached 40 PSI and was kept constant by venting off the excess gasses.

After 5.5 hours the reaction product reached the desired color intensity ($Abs_{610}$=0.245) at which point the gas vents were open and reaction mixture was cooled to 23° C. Potassium Hydroxide (0.240 kg, 50%) was added to adjust the pH (2.81) which gave final caramel color intensity ($Abs_{610}$=0.216) and specific density @ 20° C. of 1.259 gm/ml.

The measured concentration of 4-MeI was 7.3 mg/kg with measured viscosity of 27.62 cP @ 30° C., and caramel proved to be 62% as stable as the most stable caramel color made from glucose syrup, which is in agreement with stability ratios between glucose and sucrose non-low-4-MeI caramels.

Example 6: Processing of Regular Double Strength Caramel

Double strength Class IV caramel (117.2 kgs)(source: DD Williamson) and treated process water (100.5 kg) were mixed in a feed tank. The pH of the resulting diluted caramel to was adjusted to a ~pH 7.9 using a 25% NaOH solution (food grade).

The caramel solution was diafiltered using a filtration unit (GEA Model R Pilot Filtration Unit) with a 8 inch nanofiltration spiral membrane element with molecular weight cutoff of ~700, at a filtration temperature of about 80° F. and a filtration pressure of ~525 psi. During diafiltration, the pH of the caramel solution was maintained at 7.8±0.15 d and the level of water in the feed tank was maintained at a constant level.

The permeate was directed to the balance tank of a reverse osmosis (RO) unit (Filtration Engineering Pilot) with two 8 inch RO elements. The permeate flux of the RO unit was matched to the filtration unit initially at ~ about 18 liters per hour per m².

One hour into diafiltration, the filtration unit was switched to constant flux mode of about 33 liters per hour per m². The permeate flux of the RO unit was then matched to the filtration unit at about 33 liters per hour per m². Diafilitration continued for an additional six hours.

The retentate in the feed tank was concentrated to Tinctorial Power (TP) of ~0.35. The pH of the concentrated retenate was adjusted to ~pH 3 with 75% phosphoric acid (food grade). The concentrated retentate was collected and stored in the refrigerated conditions or further spray dried to a caramel powder for a long term storage.

The concentrated retentate with TP of ~0.35 had a 4-MeI content of 0.8 ppm.

Example 7: Processing of Low 4-MeI Double Strength Caramel

Low 4-MeI double strength caramel (115 kgs) and treated process water (110 kg) were mixed in a feed tank. The pH of the resulting diluted caramel to was adjusted to a ~pH 7.9 using a 25% NaOH solution (food grade).

The caramel solution was diafiltered using a filtration unit (GEA Model R Pilot Filtration Unit) with a 8 inch nanofiltration spiral membrane element with molecular weight cutoff of ~600 to 800, at a filtration temperature of about 80° F. and a filtration pressure of ~525 psi. During diafiltration, the pH of the caramel solution was maintained at 7.8±0.15 d and the level of water in the feed tank was maintained at a constant level.

The permeate was directed to the balance tank of a reverse osmosis (RO) unit (Filtration Engineering Pilot) with two 8 inch RO elements. The permeate flux of the RO unit was matched to the filtration unit initially at about 18 liters per hour per m².

One hour into diafiltration, the filtration unit was switched to constant flux mode of about 27 liters per hour per m². The permeate flux of the RO unit was then matched to the filtration unit at about 27 liters per hour per m². Diafilitration continued for an additional six hours.

The retentate in the feed tank was concentrated to Tinctorial Power (TP) of ~0.35. The pH of the concentrated retenate was adjusted to ~pH 3 with 75% phosphoric acid (food grade). The concentrated retentate was collected and stored. in the refrigerated conditions or further spray dried to a caramel powder for a long term storage The concentrated retentate with TP of ~0.35 had a 4-MeI content of 0.09 ppm.

We claim:

1. A method of reducing the low molecular weight component of a caramel solution, comprising:
   (i) adding a caramel selected from a class III or class IV caramel and water to a feed tank to provide a caramelized solution, said caramel comprising low molecular weight species and high molecular weight species;
   (ii) adjusting the pH of the caramelized solution in the feed tank to greater than 7.5;
   (iii) subjecting the caramelized solution to diafiltration to provide a retained fraction and a permeated fraction, said retained fraction comprising high molecular weight species and water;
   (iv) subjecting the permeate fraction to reverse osmosis to provide a recycle water stream and a permeate concentrate stream;
   (v) adding the retained fraction and recycle water stream to the feed tank in (i);
   (vi) repeating steps (iii)-(vi) one or more times to provide a concentrated, purified class III or class IV caramel that has less than about 10 ppm 4-methylimidazole (4-MeI), wherein the pH is not adjusted when the retained fraction and recycle water stream are added to the feed tank; and,
   (vii) adjusting the pH of the concentrated, purified class III or class IV caramel from step (vi) to between about 2.4-3.25; and
   wherein the diafiltration comprises a molecular weight cutoff (MWCO) of about 600 to 800 Dalton.

2. The method of claim 1, wherein the purified class III or IV caramel has a reduced amount of species selected from the group consisting of 2-methylimidazole, 5-hydroxy methyl furfural, 5-hydroxy 2-methyl pyridine, 2-hydroxy pyridine and 2-hydroxy-6methylpyridine carboxylic acid.

3. The method of claim 1, wherein the purified class III or IV caramel has less than about 5 ppm 4-methylimidzaole.

4. The method of claim 3, wherein the purified class III or IV caramel has less than 1 ppm 4-methylimidazole.

5. The method of claim 1, wherein the diafiltration is nano-filtration.

6. The method of claim 1, wherein the diafiltration is carried out in constant flux mode, constant pressure mode or a combination thereof.

7. The method of claim 1, wherein the method is carried out at a temperature from about 60° F. to about 95° F.

8. The method of claim 1, wherein the method is carried out at a constant pressure in the range of about 50 to about 55 psi.

9. The method of claim 1, wherein the process time for the method is from about 2 hours to about 10 hours.

10. The method of claim 1, wherein the pH adjustment in step (vii) is adjusted by addition of 75% food grade phosphoric acid.

11. The method of claim 1, further comprising collecting and storing the purified class III or class IV caramel.

12. The method of claim 1, further comprising spray-drying the purified class III or class IV caramel to provide a powder.

* * * * *